United States Patent [19]
Diamondstein et al.

[11] Patent Number: 5,948,050
[45] Date of Patent: Sep. 7, 1999

[54] FAST CONVERSION TWO'S COMPLEMENT ENCODED SHIFT VALUE FOR A BARREL SHIFTER

[75] Inventors: Marc Stephen Diamondstein; Hosahalli R. Srinivas, both of Allentown, Pa.

[73] Assignee: Lucent Technologies Inc., Murray Hill, N.J.

[21] Appl. No.: 08/769,716

[22] Filed: Dec. 19, 1996

Related U.S. Application Data

[60] Provisional application No. 60/009,878, Dec. 29, 1995.

[51] Int. Cl.$^6$ .............................. G06F 7/00; G06F 15/00
[52] U.S. Cl. ............................................. 708/209
[58] Field of Search ........................................ 364/715.08

[56] References Cited

U.S. PATENT DOCUMENTS

| | | | |
|---|---|---|---|
| Re. 33,664 | 8/1991 | Kang et al. | 364/900 |
| 4,665,538 | 5/1987 | Machida | 377/69 |
| 4,782,457 | 11/1988 | Cline | 364/715 |
| 4,829,460 | 5/1989 | Ito | 364/715 |
| 4,831,571 | 5/1989 | Tokumaru | 364/715 |
| 4,839,839 | 6/1989 | Tokumaru et al. | 364/715 |
| 5,130,940 | 7/1992 | Omote | 364/715 |
| 5,144,573 | 9/1992 | Greiner | 364/738 |
| 5,155,698 | 10/1992 | Niimi | 364/715 |
| 5,262,971 | 11/1993 | Yamaguchi | 364/718.08 |
| 5,416,731 | 5/1995 | Dang et al. | 364/715.08 |
| 5,457,723 | 10/1995 | Murakami | 377/64 |
| 5,652,718 | 7/1997 | Thomson et al. | 364/715.08 |
| 5,729,482 | 3/1998 | Worrell | 364/715.08 |
| 5,777,906 | 7/1998 | Lau et al. | 364/715.08 |

Primary Examiner—Emmanuel L. Moise
Attorney, Agent, or Firm—David L. Smith

[57] ABSTRACT

In accordance with the present invention, a method and apparatus are provided for controlling an N-bit barrel shifter to shift the bits of an input word by a shift value. The method includes the steps of performing a ones' complement of an m-bit binary representation of a shift value to generate an input when the shift direction takes on a first direction and passing the binary representation of the shift value as the input when the shift direction takes on a second direction. Decoding the input into $2^m$ control signals and generating a plurality of groups of control signals from the $2^m$ control signals. Selecting one of the plurality of groups of control signals as the control activation for the barrel shifter. The apparatus provides bits of a binary representation of the shift value are passed through a plurality of exclusive OR gates and provided as inputs to a first decoder. The first decoder decodes the inputs into a plurality of bits used as control signals. The control signals are grouped in a plurality of groups. Some of the groups of control signals may be supplemented with additional control signals such as zero filling. Based on a select input a multiplexer selects which one of the plurality of groups of control signals is passed to control the barrel shifter. A second decoder decodes the shift direction and sign of the shift value to provide a select input to the multiplexer.

17 Claims, 3 Drawing Sheets

FAST CONVERSION TWO'S COMPLEMENT ENCODED SHIFT VALUE FOR A BARREL SHIFTER

This application claims benefit of provisional application 60/009,878 filed Dec. 29, 1995.

TECHNICAL FIELD

This invention relates generally to barrel shifters, and more particularly to fast conversion of a two's complement encoded shift value to control a barrel shifter.

BACKGROUND OF THE INVENTION

An N-bit barrel shifter, where N is the bit width of the barrel shifter, is a combinational logic circuit with N data input bits, N data output bits, and N control inputs which may be encoded in $\log_2 N$ bits. The N data input bits are an input word. The N data output bits are the input word either rotated or shifted by the number of bit positions, designated a shift value, determined by the control inputs. A barrel shifter can be employed to shift either left or right and the shift value can take on any value in the range +(N−1) to −(N−1). Barrel shifters can accommodate only left shifts, only right shifts, or either left or right shifts. Rather than provide two barrel shifters, one for left shifts and another for right shifts, barrel shifters often include appropriate multiplexing to accommodate either left or right shifts. Such barrel shifters are known as bidirectional barrel shifters. Bidirectional barrel shifters permit greater flexibility in system design since the shift value and direction of shift are often not known in advance. Thus, both a shift value and a shift direction need to be provided to a bidirectional barrel shifter as control inputs. With two input quantities, there are four possible combinations: a positive right shift; a negative right shift (which is actually a left shift); a positive left shift; and a negative left shift (which is actually a right shift). A barrel shifter has a dominant shift direction and to shift in the other direction requires a conversion of the shift value to a value that is the difference between the bit width of the barrel shifter and the shift value. Barrel shifters make a data path a single stage and decode an m-bit shift value into $2^m-1$ control bits to control the barrel shifter.

Barrel shifters can be used to provide arithmetic or logic shifts, as well as a rotate operation. In a left shift, each bit of the input word is shifted to the left in the output word by the number of bit locations indicated by the shift value. The low order bits of the output word are zero filled. In a right shift, each bit of the input word is shifted to the right by the number of bit locations indicated by the shift value to produce the output word. The high order bits are filled with sign extensions for arithmetic shifts or zeros for logic shifts. A rotate operation can occur in either the left or right directions. A rotate operation provides that each bit shifted out of one end of a word reappears and is shifted into the other end of the word.

Computations in digital signal processors are performed with two's complement hardware. The shift value must be represented in a two's complement number system, which is the radix complement for binary numbers. Two's complement representations of numbers can be obtained from a binary representation by complementing the individual digits, and adding one. In the two's complement number system, the most significant bit is one for negative numbers and zero for positive numbers. Zero is considered positive because its sign is positive. For an m-bit representation, numbers may range from $-(2^{m-1})$ through through $+(2^{m-1}-1)$ with one negative number, $-2^{m-1}$, that does not have a positive counterpart.

A two's complement representation of a number can be produced from a binary representation using exclusive OR gates (EOR) and an adder as shown in the schematic diagram of FIG. 3 illustrating a prior art technique for controlling a barrel shifter. The shift direction is represented as a 0 for a right shift and a 1 for a left shift. The shift direction 302 is combined with the sign bit 304 of the shift value 308 in exclusive OR gate 300 to produce a modified shift direction 306. The sign bit is 0 for positive shift values and 1 for negative shift values. The bits of the shift value 308 are exclusive ORed with the shift direction 302 in EOR gates $310_0$ through $310_{m-1}$ and 311 to produce a ones' complement of the bits at the output 312. To accommodate the shift direction, either a zero for shifts in the dominant direction of the barrel shifter, or the bit width of the barrel shifter, is selected by multiplexer 316 as controlled by select input 306, to be added to the two's complement representation of the shift value in full adder 318. The shift direction 302 is added to the ones' complement representation and either zero or the bit width of barrel shifter 314, as selected by multiplexer 316, in full adder 318 to produce a two's complement representation of the shift value at output 320. The most significant bit of output 320 is discarded. The output from full adder 318 is always positive. The low order m bits of output 320 of full adder 318 is an encoded shift value, represented by m bits that are decoded in decoder 324 to provide N control signals 326 used to control barrel shifter 314. Barrel shifter 314 also receives the modified shift direction 306 directly and, in response to the control inputs 326, produces as its output 330 a shifted version of the input word 328.

This prior art technique has the shortcoming of introducing a delay in producing the N control signals used to control barrel shifter 314. The delay results from operation of adder 318. A delay in producing the control inputs to barrel shifter inherently introduces a delay in operation of the barrel shifter.

SUMMARY OF THE INVENTION

In accordance with the present invention, a method and apparatus are provided for controlling an N-bit barrel shifter to shift the bits of an input word by a shift value. The method includes the steps of performing a ones' complement of an m-bit binary representation of a shift value to generate an input when the shift direction takes on a first direction and passing the binary representation of the shift value as the input when the shift direction takes on a second direction. Decoding the input into $2^m$ control signals and generating a plurality of groups of control signals from the $2^m$ control signals. Selecting one of the plurality of groups of control signals as the control activation for the barrel shifter. The apparatus provides bits of a binary representation of the shift value are passed through a plurality of exclusive OR gates and provided as inputs to a first decoder. The first decoder decodes the inputs into a plurality of bits used as control signals. The control signals are grouped in a plurality of groups. Some of the groups of control signals may be supplemented with additional control signals such as zero filling. Based on a select input a multiplexer selects which one of the plurality of groups of control signals is passed to control the barrel shifter. A second decoder decodes the shift direction and sign of the shift value to provide a select input to the multiplexer.

BRIEF DESCRIPTION OF THE DRAWINGS

The invention will now be described by way of example with reference to the Figures, in which.

DETAILED DESCRIPTION

Figure 1:
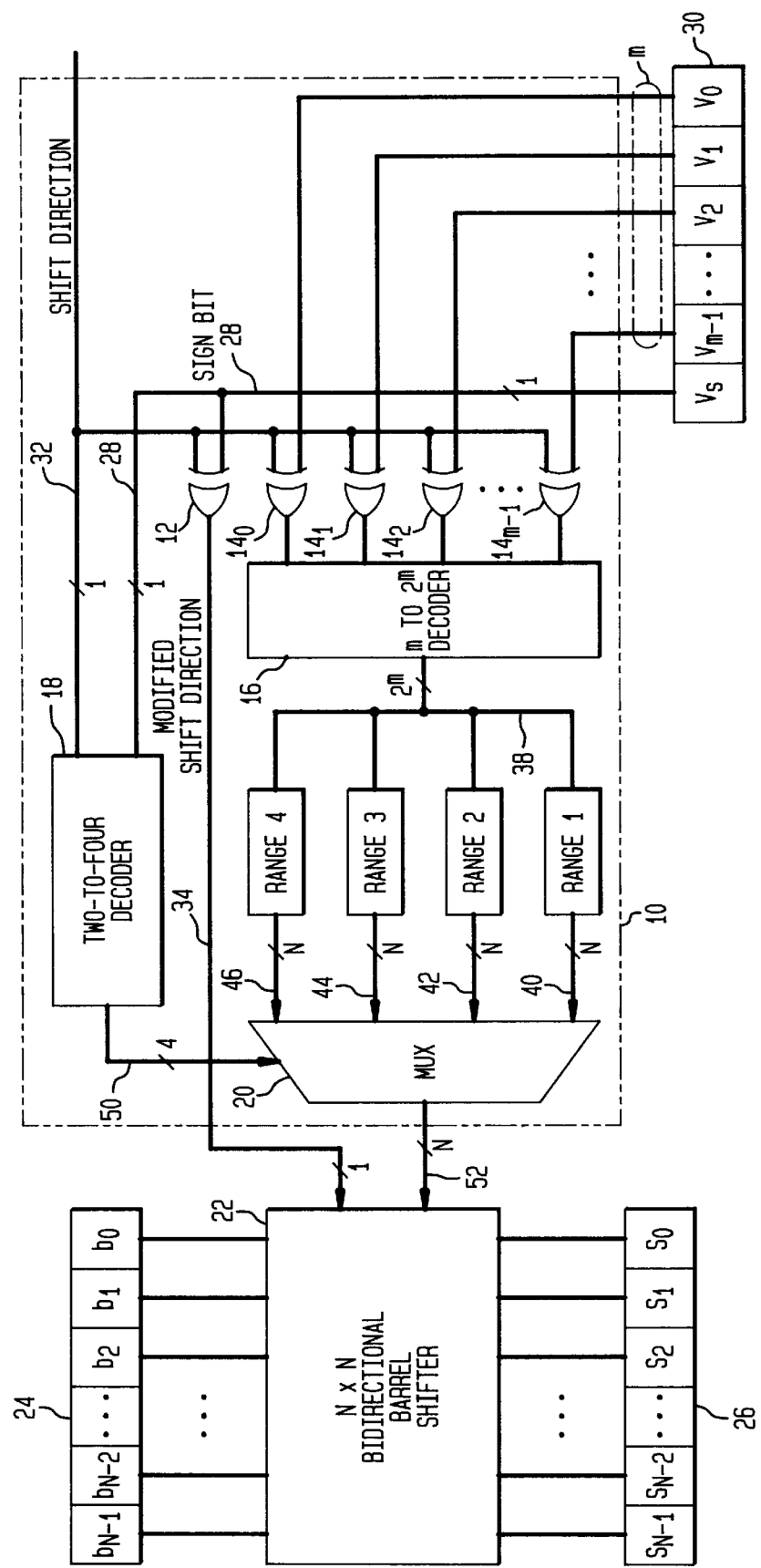
FIG. 1 is a schematic diagram illustrating a barrel shifter control circuit in accordance with the present invention.

A control circuit 10 for controlling a barrel shifter, such as bidirectional barrel shifter 22, in accordance with an illustrative embodiment of the invention is shown in the schematic diagram of FIG. 1. Control circuit 10 includes a modified shift direction generator, EOR gate 12, a ones' complement generator, comprised of exclusive OR gates $14_o$ through $14_{m-1}$, decoders 16 and 18, and multiplexer 20. Control circuit 10 is fabricated on and is a part of an integrated circuit chip. Control circuit 10 may be part of a microprocessor or digital signal processor, or may be part of other integrated circuits.

Control circuit 10 must accommodate the four possible control requests of: a positive right shift, a negative right shift (which is actually a left shift), a positive left shift, and a negative left shift (which is actually a right shift). In a preferred embodiment, barrel shifter 22 is a bidirectional barrel shifter that can accommodate both right and left shifts of an N-bit input word 24, resulting in an N-bit shifted output word 26.

The inputs to control circuit 10 are the shift value 30 and shift direction 32. The shift value 30 is an m-bit binary representation of the shift value. The high order bit is the sign bit and typically will be one for negative shift values and zero for positive shift values. The shift direction is either left or right, requiring only a single bit to represent. The illustrative embodiment will be described with a left shift designated by a one and a right shift designated by a zero.

The sign bit of shift value 30 and the shift direction provide inputs to EOR gate 12 which combines the inputs, and provides as an output modified shift direction 34 which is the exclusive OR combination of the inputs. Modified shift direction 34 is provided as an input to barrel shifter 22. EOR gate 12 decodes the shift direction and sign bit of the shift value to produce a modified shift direction that is the exclusive OR combination of the inputs as shown in Table I.

TABLE I

| Shift Direction | Sign Bit | Modified Shift Direction |
| --- | --- | --- |
| 0 (right) | 0 (positive) | 0 (right) |
| 0 (right) | 1 (negative) | 1 (left) |
| 1 (left) | 0 (positive) | 1 (left) |
| 1 (left) | 1 (negative) | 0 (right) |

Exclusive OR gates 14 are a plurality of m exclusive OR gates corresponding in number to the number of bits in shift value 30. Each exclusive OR gate $14_o$–$14_{m-1}$ receives the shift direction 32 as one input and one of the m-bits of shift value 30 as the other input and combines the inputs to produce respective outputs. The output 36 from EOR gates $14_o$ through $14_{m-1}$ is m-bits that represents a ones' complement of the binary representation of the shift value 30.

The m-bit ones' complement output 36 from EOR gate $14_o$ through $14_{m-1}$ provides the input to decoder 16. Decoder 16 is a combinational logic circuit that decodes the m-bit ones' complement into $2^m$ decoded output control signals 38 to be provided to barrel shifter 22. One of the $2^m-1$ outputs is high and the other $2^m-1$ outputs are low. In a preferred embodiment, the output that is high is the output represented by the binary input to the decoder. By way of example, Table II illustrates the decoding of three bits into eight outputs designated CL0 through CL7.

TABLE II

| Binary Input | | | Decoder Outputs | | | | | | | |
| --- | --- | --- | --- | --- | --- | --- | --- | --- | --- | --- |
| | | | CL7 | CL6 | CL5 | CL4 | CL3 | CL2 | CL1 | CL0 |
| 0 | 0 | 0 | 0 | 0 | 0 | 0 | 0 | 0 | 0 | 1 |
| 0 | 0 | 1 | 0 | 0 | 0 | 0 | 0 | 0 | 1 | 0 |
| 0 | 1 | 0 | 0 | 0 | 0 | 0 | 0 | 1 | 0 | 0 |
| 0 | 1 | 1 | 0 | 0 | 0 | 0 | 1 | 0 | 0 | 0 |
| 1 | 0 | 0 | 0 | 0 | 0 | 1 | 0 | 0 | 0 | 0 |
| 1 | 0 | 1 | 0 | 0 | 1 | 0 | 0 | 0 | 0 | 0 |
| 1 | 1 | 0 | 0 | 1 | 0 | 0 | 0 | 0 | 0 | 0 |
| 1 | 1 | 1 | 1 | 0 | 0 | 0 | 0 | 0 | 0 | 0 |

The invention takes advantage of the decoding operation following the ones' complement operation. As can be seen from Table II, incrementing the decoder input by one is the same as shifting the decoder output control line that is high one control line to the left. In the example shown in Table II, incrementing the input to decoder 16 by one, such as from $3_{10}(011_2)$ to $4_{10}(100_2)$, and zero filling on the right, shifts the control line output that is high from CL3 being high to control line CL4 being high. Zero filling, such as coupling a hard wire to VSS, maintains all control outputs 38 low except one. The shift direction may differ with the convention used to represent right and left shifts.

Decoder 18 is a combinational logic circuit that decodes a two-bit input into four outputs. One of the four outputs 50 is high and the other three are low for each of the 2-bit input combinations. The shift direction 32 and sign bit 28 of the shift value 30 are decoded in decoder 18 to provide four select inputs 50 to multiplexer 20. The four select inputs select one of the four inputs 40, 42, 44, or 46 as the output 52 of multiplexer 20. The select inputs 50 are decoded simultaneously with operation of ones' complement evaluation and operation of decoder 16 so as to minimize delay in operation of control circuit 10 and in turn, barrel shifter 22. The decoding of two inputs into four outputs is illustrated in Table III.

TABLE III

| Shift Direction | Sign Bit | Decoder Output | Input Selected |
| --- | --- | --- | --- |
| 0 | 0 | 0001 | 40 |
| 0 | 1 | 0010 | 42 |
| 1 | 0 | 0100 | 44 |
| 1 | 1 | 1000 | 46 |

Decoder 16 receives m input bits and decodes the m input bits into $2^m$ outputs 38 to control barrel shifter 22. Barrel shifter 22 has a bit width of N, where $N \leq 2^m$. For a bit width of $N=2^m$ representing a fully populated decoder, the full range of $2^m$ possible shift values, from $-(N-1)$ to $(N-1)$, would be employed. For less than a fully populated decoder, $N<2^m$, not all of the $2^m$ possible shift values are employed.

Four sets of control signals 40, 42, 44 and 46 are provided as inputs to multiple bit multiplexer 20. Each of the four sets of control signals are derived from the $2^m$ outputs 38, such as by hard wiring. Each of the $2^m$ outputs 38 from which control signals 40, 42, 44 and 46 are formed are generated for each shift value and shift direction received. Multiplexer 20 is employed to select the appropriate outputs 38 to provide as control signals 52 to barrel shifter 22. Control signals 52 provide N control signals to barrel shifter 22 on control lines 0 through N−1.

Control signals 40 are selected when both the shift direction and sign bit are zero, that is when the shift direction is right and the shift value is positive. This represents a positive right shift, the dominant shift direction of bidirectional barrel shifter 22 in the preferred embodiment. Control signals 40 are selected from the $2^m$ control signals 38 generated by decoder 16. To achieve a positive right shift, the input to decoder 16 is the shift value which has a range of [0, (N−1)]. The control signals 38 output on control lines 0 through (N−1) are selected, such as by hard wiring, as control signals 40. Another notation would express the range of control signals 38 selected as control signals 40 as [LSB:MSB] being [0:(N−1)], shown as RANGE1 in FIG. 1.

Control signals 42 are selected when the shift direction is zero and the sign bit is one, that is when the shift direction is right and the shift value is negative. A negative right shift actually represents a left shift. Control signals 42 are selected from the $2^m$ control signals 38 generated by decoder 16. To achieve a negative right shift, the input to decoder 16 has a range of [0, (N−1)]. The control signals 38 output from decoder 16 on control lines $[2^{\lceil log_2 N \rceil}-(N-1):2^{\lceil log_2 N \rceil}-1, VSS]$ shown as RANGE2 in FIG. 1, are selected, such as by hardwiring, as control signals 42. The notation $\lceil log_2 N \rceil$ represents a ceiling function, in which fractional values are rounded up to the next higher integer. VSS represents a zero filling necessitated by a shift. The control signals 38 are modified to be control signals 42 such as by hard wire subtracting one. This shifts the control signals 38 by one location, which is the same as being decremented by one. Using the convention in the illustrative embodiment, the control signals 38 are shifted to the right one line to produce control signals 42. Shifting control signals 38 to the right one line is equivalent to subtracting one from the ones' complement representation of the shift value. Control signals 42 are provided to bidirectional barrel shifter 22 through multiplexer 20 as selected by select input 50.

Control signals 44 are selected when the shift direction is one and the sign bit is zero, that is when the shift direction is left and the shift value is positive. This represents a positive left shift. Control signals 44 are selected from the $2^m$ control signals 38 generated by decoder 16. To achieve a positive left shift, the input to decoder 16 the ones' complement of the shift value. The sign of the ones' complement of the shift value is not used. The control signals 38 output from decoder 16 on control lines $[2^{\lceil log_2 N \rceil}-N:2^{\lceil log_2 N \rceil}-1]$, shown as RANGE3 in FIG. 1, are selected, such as by hardwiring, as control signals 42. Control signals 44 are provided to bidirectional barrel shifter 22 through multiplexer 20 as selected by select input 50.

Control signals 46 are selected when the shift direction is one and the sign bit is one, that is when the shift direction is left and the shift value is negative. A negative left shift actually represents a right shift. Control signals 46 are selected from the $2^m$ control signals 38 generated by decoder 16. To achieve a negative left shift, the input to decoder 16 is the ones' complement of the shift value. To obtain a two's complement representation of a number from a binary representation, the ones' complement is taken, and one is added to the ones' complement. Since the ones' complement of the negative shift value was generated as the input to decoder 16, it is only necessary to add one. This is achieved by shifting the output of the decoder 16 by one control line as described above. The control signals 38 output from decoder 16 on control lines [VSS, 0:(N−2)], shown as RANGE4 in FIG. 1, are selected, such as by hardwiring, as control signals 46. VSS represents a zero filling necessitated by a shift. The input shift value for negative left shifts has a range from −1 to −(N−1). Control signals 46 are provided to bidirectional barrel shifter 22 through multiplexer 20 as selected by select input 50.

As can be seen from the illustrative embodiment, for a positive shift value in the dominant shift direction, control signals 38 at control lines [0:(N−1)] are selected to control the barrel shifter. When the shift value is negative, a shift in the control lines output by decoder 16 is utilized to generate the control signals provided to multiplexer 20. When the shift direction is not the dominant shift direction, in the illustrative example, the ones' complement of the shift value provides the input to decoder 16.

Figure 2:
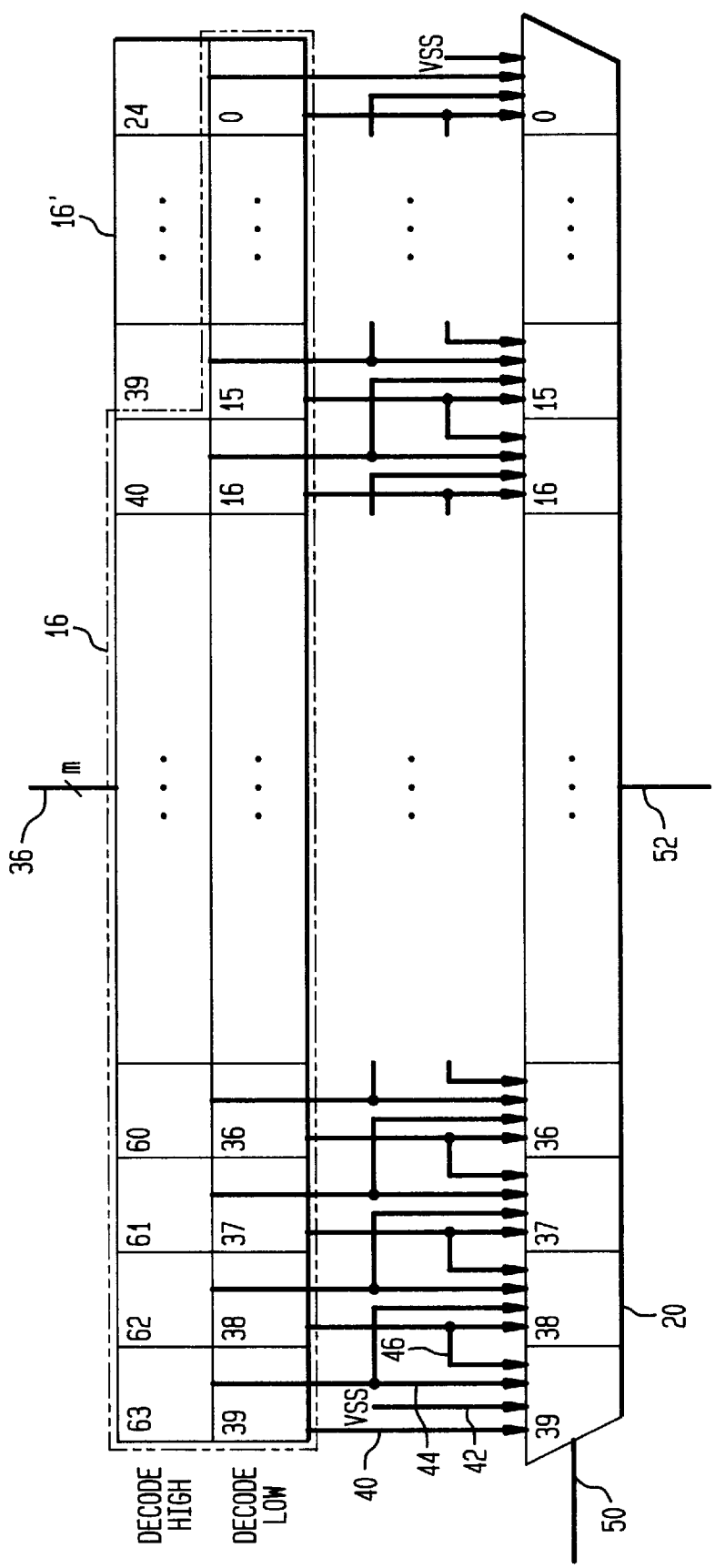
FIG. 2 is a more detailed schematic of a portion of the cells of a decoder and an output control selection multiplexer.
Figure 3:
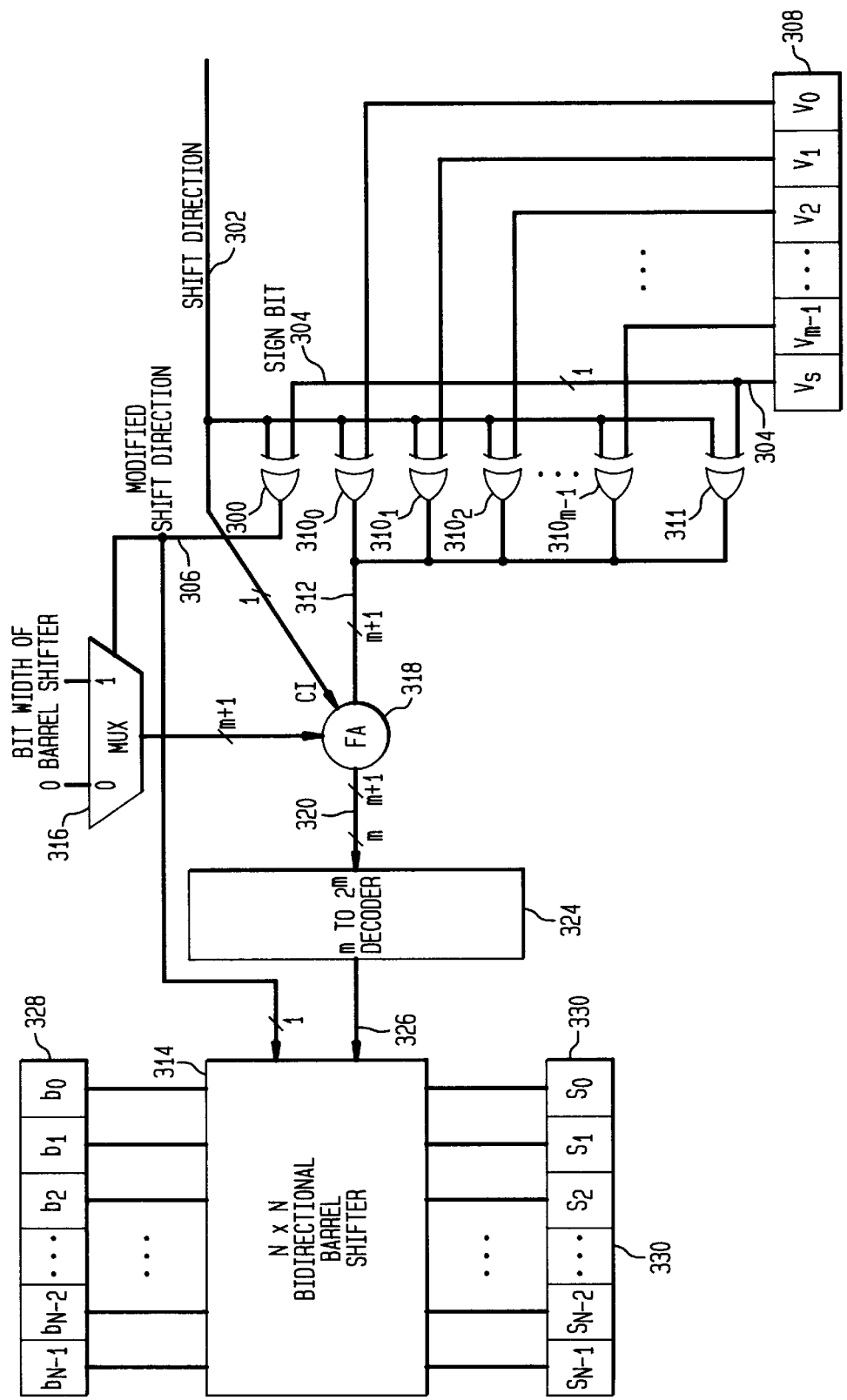
FIG. 3 is a schematic diagram illustrating a prior art technique for controlling a barrel shifter.

FIG. 2 is a schematic diagram showing decoder 16 and multiplexer 20, hardwire shifting, and zero filling. In addition, FIG. 2 shows a technique that may be used in layout of the invention on a chip. For example, a barrel shifter having a 40 bit width would require six bits to represent the shift value, exclusive of the sign bit. A decoder 16 would produce 64 outputs 52, designated bit 0 through 63. Decoder 16 is comprised of $2^m$ cells, designated in FIG. 2 by the output number. Each of the cells of decoder 16 can be fabricated on-pitch with the hardwire shifting, and on pitch with a cell of multiplexor 20. Bit 63 needs to be provided as an input to both cells 39 and 38 of multiple bit multiplexer 20. Bit 62 needs to be provided as an input to both cells 38 and 37 of multiplexer 20. Similarly, bit 38 needs to be provided as an input to both cells 39 and 38 of multiplexer 20, and bit 37 needs to be provided as an input to both cells 38 and 37 of multiplexor 20. VSS is provided as one of the inputs to each of cells 39 and 0 of multiplexer 20 to achieve a zero fill when adding one by a shift operation. The four inputs to each of the cells of multiplexer 20 are, from left to right in FIG. 2, control signals 40, 42, 44 and 46.

Instead of fabricating on pitch a 0–63 cell decoder 16, cells 0 through 39 of decoder 16 are fabricated on-pitch with corresponding cells of 0 through 39 of multiplexer 20. Decoder cells 24 through 39 are duplicated forming decoder 16 and lined up with decoder cells 0 through 15 of both decoder 16 and multiplexer 20, and overlaid above cells 0 through 15 of decoder 16. Cells 40 through 63 of decoder 16 are lined up with corresponding ones of cells 16 through 39 of decoder 16, and overlaid above cells 16 through 39.

By stacking decoders in this manner, the amount of shifting is limited. For a right positive shift, the output bits from cells 0 through 39 of decoder 16 provide the inputs, pitch-matched, directly to cells 0 through 39 of multiplexer 20. No shifting is required. These are control signals 40.

For a left negative shift, the output bits from cells 0 through 38 of decoder 16 are provided as the inputs, pitch-matched and shifted by one unit of pitch, to cells 1 through 39 of multiplexor 20, with ground (VSS) providing the input to cell 0 of multiplexer 20. Only one conductive (e.g., metal) routing track is necessary at the output of decoder 16 to accomplish the shifting.

For a left positive shift, the output bits from cells 24 through 63 of ecoder 16 provide the inputs, pitch-matched, directly to cells 0 through 39 of ultiplexer 20, with no shifting. These are control signals 44.

For a right negative shift, the output bits from cells 25 through 63 of decoder 16 are provided as the inputs, pitch-matched and shifted by one unit of pitch, to cells 0 through 38, with ground providing the input to cell 39 of multiplexer 20. Only one conductive routing track, in the opposite direction of shift, is necessary to accomplish the shifting. The routing track shifting to accomplish a right negative shift is opposite to the routing track shifting to accomplish a left negative shift.

In the case where N is a power of two, only a single row of decoder cells is required, with no duplication of cells. The two routing track shifts are still necessary.

The N output control signals 52 provided by multiplexer 20 are provided to barrel shifter 22 to control barrel shifter 22. Additional control inputs may be provided to barrel shifter 22.

While an illustrative embodiment of the invention has been described as controlling a bidirectional barrel shifter, the invention is not limited thereto. The invention can also be used to control right shift or left shift barrel shifters.

Many variations may be made to the illustrative embodiment and still be within the scope of the invention. By way of example and not limitation, a barrel shifter control circuit that did not use the convention of zero representing a right shift direction and one representing a left shift direction, or a zero sign bit representing a positive shift value and a one sign bit representing a negative shift value, could be designed. Furthermore, a barrel shifter control circuit could be designed in which the dominant shift (sign bit 0 and shift direction 0) was not positive to the right. In addition, other methods than hard wiring could be used to modify the decoder outputs for appropriate selection by a multiplexer. The decoders have been described as having one output that is high with the remaining outputs low. A control circuit could be designed with the opposite states, or some other combination of states. In such a barrel shifter, filling by a logic high, rather than by a logic low may be required.

This invention is particularly useful in communications systems and equipment employing integrated circuits including this technique. Such communications systems and equipment has the advantage of eliminating the delay of an adder, usually a ripple adder, trading off the delay through an adder for a multiplexer delay, where the multiplexer inputs are set up during operation of a decoder. In this manner, integrated circuits that employ this technique can operate barrel shifters more quickly than control circuits of the prior art resulting in higher speed right and left shifts or rotate operations.

This invention takes advantage of a decoding operation following a ones' complement operation. Adding one to the input of the decoder is equivalent to shifting the high output of the decoder by one control line.

The invention claimed is:

1. A method of controlling a barrel shifter to shift the bits of an input word by a shift value, the method comprising the steps of:

performing a ones' complement of an m-bit binary representation of a shift value to generate an input when the shift direction takes on a first direction;

passing a binary representation of the shift value as the input when the shift direction takes on a second direction;

decoding the input into $2^m$ control signals;

generating a plurality of groups of control signals from the $2^m$ control signals; and selecting one of the plurality of groups of control signals as the control activation of the barrel shifter.

2. The method as recited in claim 1, further comprising the step of:

supplementing at least one of the groups of control signals with an additional control signal.

3. The method as recited in claim 1, wherein the generating step comprises selecting groups of control signals that are subsets of the $2^m$ control signals.

4. The method as recited in claim 3, further comprising the step of supplementing one of the groups of control signals with an additional control signal.

5. An integrated circuit, comprising:

a plurality of m exclusive OR gates corresponding in number to a predetermined number of bits of a binary representation of a shift value, each of the plurality of exclusive OR gates having a first input to receive a bit of the binary representation of the shift value, a second input to receive a shift direction, and an output, the output of the plurality of m exclusive OR gates providing a ones' complement of the first inputs when the shift direction takes on a first value, and the output replicating the first input when the shift direction takes on a second value;

a first decoder for receiving the output from the plurality of exclusive OR gates, the first decoder for decoding the output from the plurality of exclusive OR gates into q control signals to control a barrel shifter;

a multiplexer controlled by a select input for receiving the q control signals, and for selecting one of a predetermined number of subsets of the q control signals as its output; and a second decoder for receiving as first and second inputs the shift direction and a sign bit of the shift value, the second decoder for decoding the first and second inputs into the select input to control the multiplexer.

6. An integrated circuit as recited in claim 5, further comprising an exclusive OR gate for receiving as first and second inputs the shift direction and the sign bit of the shift value, the exclusive OR gate combining the first and second inputs to produce a modified shift direction.

7. An integrated circuit as recited in claim 6, further comprising a barrel shifter for receiving the output of the multiplexer.

8. An integrated circuit as recited in claim 7, wherein the barrel shifter is a bidirectional barrel shifter.

9. An integrated circuit as recited in claim 6, further comprising a barrel shifter for receiving the modified shift direction.

10. An integrated circuit as recited in claim 5, wherein the first decoder is comprised of a plurality of decoder cells, and the multiplexer is comprised of a plurality of multiplexer cells, the decoder cells being fabricated on-pitch with the multiplexer cells.

11. An integrated circuit as recited in claim 10, further comprising:

at least one of the plurality of decoder cells is duplicated, the decoder cells divided into a first group and a second group, the at least one duplicated decoder cells positioned adjacent the first group of decoder cells, the at least one duplicated decoder cell and the first group of decoder cells on pitch with a corresponding one of the multiplexer cells.

12. An integrated circuit as recited in claim 10, further comprising:

at least one of the plurality of decoder cells is duplicated, the decoder cells divided into a first group and a second group, the at least one duplicated decoder cells positioned adjacent the first group of decoder cells, the at least one duplicated decoder cell and the first group of decoder cells on pitch with a corresponding one of the multiplexer cells and with corresponding ones of the second group of decoder cells.

13. An integrated circuit as recited in claim 5, wherein q equals $2^m$.

14. A barrel shifter for shifting the bits of an input word by a shift value, comprising:

a circuit for performing a ones' complement of an m-bit binary representation of a shift value to generate an input when the shift direction takes on a first direction;

a circuit for passing a binary representation of the shift value as the input when the shift direction takes on a second direction;

a circuit for decoding the input into $2^m$ control signals;

circuit for generating a plurality of groups of control signals from the $2^m$ control signals; and a circuit for selecting one of the plurality of groups of control signals as the control activation of the barrel shifter.

15. The barrel shifter as recited in claim 14, further comprising a circuit for supplementing at least one of the groups of control signals with an additioanl control signal.

16. The barrel shifter as recited in claim 14, wherein the generating circuit comprises a selector for selecting groups of control signals that are subsets of the $2^m$ control signals.

17. The barrel shifter as recited in claim 16, further comprising a circuit for supplementing one of the groups of control signals with an additional control signal.

* * * * *